United States Patent
Riemhofer et al.

[15] 3,678,128
[45] July 18, 1972

[54] COATING COMPOSITIONS COMPRISING A MIXTURE OF A POLYESTER AND AN AMINOPLAST

[72] Inventors: Franz Riemhofer; Walter Dittman; Uwe Biethan; Karl-Heinz Hornung; Ernst-Christian Schultze, all of Marl, Germany

[73] Assignee: Chemische Werke Huls Aktiengesellschaft, Marl, Germany

[22] Filed: Oct. 23, 1969

[21] Appl. No.: 868,895

[30] Foreign Application Priority Data

Oct. 25, 1968 Germany..................P 18 05 186.0
Oct. 25, 1968 Germany..................P 18 05 185.9
Oct. 25, 1968 Germany..................P 18 05 182.6

[52] U.S. Cl..............260/850, 117/132 B, 117/132 BF, 117/161 K, 117/161 LN, 260/33.4 R, 260/33.4 P, 260/33.6 R, 260/39 R, 260/75 R
[51] Int. Cl..................................................C08g 37/34
[58] Field of Search..............................260/850, 75

[56] References Cited

UNITED STATES PATENTS

| | | |
|---|---|---|
| 2,437,657 | 3/1948 | West et al...................260/850 |
| 2,683,100 | 7/1954 | Edgar et al..................260/850 |
| 3,442,842 | 5/1969 | Van Bonin...................260/850 |
| 3,476,697 | 11/1969 | Clements....................260/850 |
| 3,507,820 | 4/1970 | Maeda.......................260/850 |

*Primary Examiner*—John C. Bleutge
*Attorney*—I. William Millen

[57] ABSTRACT

Coating compositions resistant to yellowing, solvents, acids and alkalies and having the combination of high elasticity and good hardness are produced by using a mixture of
a. an aminoplast and
b. a polyester having an average molecular weight of 400–4,000 of (I) a diol mixture which includes one or both of ethylene glycol and 1,2-propanediol, and (II) an acid mixture which consists essentially of 91–33 percent of a cyclic dicarboxylic acid and 9–67 percent of an acyclic dicarboxylic acid.

8 Claims, No Drawings

COATING COMPOSITIONS COMPRISING A MIXTURE OF A POLYESTER AND AN AMINOPLAST

BACKGROUND OF THE INVENTION

This invention relates to coating compositions containing as the binder a mixture comprising an aminoplast and a polyester.

It is known from German Pat. No. 1,015,165 that coatings can be produced by curing a mixture of a phthalic acid — fumaric acid — propylene glycolpolyester and a butylated melamine-formaldehyde resin. The thus-obtained varnish films exhibit a low chemical resistance. It is also known from German Pat. No. 1,015,165 that coatings having an extraordinary chemical resistance are obtained when an alkylated melamine-formaldehyde or urea-formaldehyde condensation product is combined with a linear polyester produced by the polyesterification of a dicarboxylic acid with a diol of the formula:

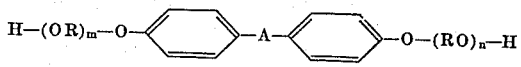

wherein

A represents a 2-alkylidene radical of three to four carbon atoms, R is an alkylene radical of two to three carbon atoms, $m$ and $n$ each represents at least 1, and the sum of m and n is no longer than 3. Although the coatings obtained are hard, they are very brittle, as shown in Comparative Example 1 below.

In U.S. Pat. No. 2,460,186, polyesters of 2-ethylhexanediol-1,3 are described as plasticizers of exceptional value for use with urea-formaldehyde and melamine-formaldehyde condensation products. These coatings, although flexible and impact resistant, are relatively soft, as shown in Comparative Example 2.

As shown in Comparative Examples 3 and 4, other mixtures of linear polyesters and a melamine-formaldehyde resin produce coatings which, although flexible, are too soft.

SUMMARY OF THE INVENTION

According to this invention coating compositions having high elasticity and good hardness are produced by the use of an aminoplast-polyester mixture as a binder in which the linear polyesters have an average molecular weight of between 400 and 4,000 and are produced by the esterification of I. an alcohol mixture consisting of:
  1. one or both of ethylene glycol and 1,2-propanediol, and
  2. optionally, up to 30 molar percent, preferably up to 20 molar percent of the total amount of the alcohol mixture of one or more other aliphatic or cycloaliphatic diols whose hydroxyl functions are separated by two to eight carbon atoms and up to two of the carbon atoms of which in the chain are substituted by oxygen atoms which are separated from each other by at least two carbon atoms, and II. an acid mixture consisting of:
  1. 91–33 molar percent, preferably 75–50 molar percent, of at least one aromatic or cycloaliphatic dicarboxylic acid or functional acid derivative thereof convertible to an ester of the alcohol mixture, and
  2. 9–67 molar percent, preferably 25–50 molar percent, of at least one aliphatic dicarboxylic acid of four to 12 carbon atoms or functional acid derivative thereof convertible to an ester of the alcohol mixture.

DETAILED DESCRIPTION OF THE INVENTION

A. Aminoplast Component

Aminoplasts are a conventional component in coating compositions. Many of these have the formula —NH—CH$_2$—OR wherein R is hydrogen or alkyl of one to four carbon atoms and the unsatisfied valence is an organic moiety. Examples are the condensation products of aldehydes, particularly formaldehyde, with several amino- or amino-group-carrying substances, such as, for example, with melamine, urea, N,N'-ethyleneurea, dicyanodiamide, and benzoguanamine. There can also be used polymers having the structure of copolymerizates into which is polymerized an amide of an α-ethylenically unsaturated carboxylic acid having N-methylol- and/or N-methylol-ether groups, for example, such polymers which are obtained following the methods described in the U.S. Pat. No. 2,940,944 and the German Pat. applications 1,060,596, 1,083,548 and 1,089,549.

Reaction products of polymers containing hydroxyl groups and alkoxymethyl isocyanates can also be utilized. Mixtures of such products are also suitable.

Especially advantageous are the aminoplasts which are modified with alcohols, preferably alkanols of one to four carbon atoms. In place of these resinous products, it is possible to employ with equally good success precursors of aminoplasts, e.g. hexamethylol melamine, dimethylol urea, optionally in the etherified form, for example, hexamethoxymethyl melamine, hexabutoxymethyl melamine, dimethoxymethyl urea, dibutoxymethyl urea, etc. Because resinous products are sometimes compatible with the polyesters to be employed according to the invention only to a limited extent, it is preferred to employ the low-molecular weight precursors of aminoplasts, which are miscible with the polyesters to be used according to the invention to a practically unlimited degree. Such defined precursors of aminoplasts are, for example, dimethylol urea, tetramethylol benzoguanamine, trimethylol melamine or hexamethylol melamine, which can also be employed in a partially or completely etherified form, for example, as dimethoxymethyl urea, tetrakis(methoxymethyl)benzoguanamine, tetrakis(ethoxymethyl)-benzoguanamine, or polyethers of hexamethylol melamine, such as hexakis(methoxymethyl)melamine or hexakis(butoxymethyl)melamine.

Thus, a wide variety of commercially available aminoplasts can be used for combining with the special linear polyesters of the present invention. For more details regarding the aminoplasts which can be used, reference is made to "Organic Protective Coatings," Von Fischer and Bobaleck, 1953, Reinhold, pages 210–225; "Lackkunstharze" by H. Wagner and H.F. Sarx, Carl Hanser Verlag, Munchen, 4th Edition, 1959, pages 60–74. Of course, it is also possible to use mixtures of all the above N-methylol products. In general then, any compound of the formula —NH—CH$_2$—O —R can be used wherein R represents hydrogen or alkyl of 1-4 carbon atoms, and the unsatisfied nitrogen valence is attached to an organic moiety capable of incorporation into a film and which does not interfere with the curing reaction.

It is also possible to improve the miscibility of the resinous aminoplasts and the polyesters to be employed according to the invention, as well as their compatibility during the baking step, by adding to the mixture of the solutions of polyester and aminoplast certain amounts (up to 50 percent by weight, based on the total amount of solvent) of high-boiling polar solvents for both resins, such as, for example, ethyl glycol, ethyl glycol acetate, butyl glycol, or cyclohexanone, or, preferably, by reacting the polyester and the aminoplast in a conventional manner in substance, or preferably, in solution, with each other; in this connection, care must be taken that the reaction does not progress until cross-linking occurs. This can be effected, for example, by heating the mixture, or the common solution of the two resins, for a short time, optionally in the presence of a catalyst, such as, for example, organic or mineral acids.

It is also possible to add the polyesters to be employed in accordance with the invention to the charge prior to or during the preparation of the aminoplast resins from substances containing several amino and/or amido groups, such as, e.g., urea, benzoguanamine or melamine, and aldehydes, such as, for example, formaldehyde. In this connection, it is, of course, likewise possible to employ concomitantly and additionally customary alcohols for the modification of the thus-formed plasticized aminoplast resins. The methods for the production of such plasticized amino-aldehyde resins for solvent-containing as well as aqueous varnish systems are known; a plurality of suitable operating directives can be found in the literature (see, for example, Houben-Weyl, "Methoden der organischen Chemie" [Methods of Organic Chemistry], 4th Edition, Vol. 14/2, pp. 319 et seq., Georg Thieme Publishers, Stuttgart, 1963, or "Ullmanns Encyclopaedie der technischen Chemie" [Ullmann's Encyclopedia of Technical Chemistry], 3rd Edition, Vol. 3, pp. 475 et seq., Urban & Schwarzenberg,Munich,1953). For purposes of combining with the polyesters employed in accordance with the invention, a plurality of commercial aminoplasts or the defined precursors thereof are available.

B. Polyester Component

The polyester component is a mixture of polyesters having an average molecular weight between 400 and 4,000 produced by the esterification of an alcohol mixture and an acid mixture as defined below. Preferred are those having an average molecular weight between 600 and 2,500. Especially preferred are those having a molecular weight between 600 and 2,000. Coating compositions exhibiting particularly good properties are obtained with polyesters containing predominantly terminal hydroxy groups, i.e., those produced with a molar excess of the alcohol mixture over the acid mixture, e.g., those having an hydroxyl number of 25 to 270, preferably 45 to 180 mg.KOH/g., and an acid number of 1 to 7, preferably 2 to 5 mg.KOH/g.

The polyesters are produced by the esterification of an alcohol mixture and an acid mixture as defined hereinafter.

I. Alcohol Mixture

The alcohol mixture used to form the polyester component of the coating compositions contains one or both of ethylene glycol and 1,2-propanediol and up to 30 molar percent of the total alcohol mixture of one or more other diols.

1. Ethylene glycol-propylene glycol

The alcohol mixture consists at least 70 molar percent, preferably 80–100 molar percent, and most preferably 100 molar percent of a mixture of 0–100 molar percent of ethylene glycol and 100–0 molar percent of propylene glycol.

2. Other Diol

The remainder of the alcohol mixture consists of up to 30 molar percent, preferably up to 20 molar percent, of the total amount of the total diol component of one or more other aliphatic or cycloaliphatic diols whose hydroxyl functions are separated by two to eight carbon atoms and up to two of the carbon atoms of which in the chain are substituted by oxygen atoms which are separated from each other by at least two carbon atoms.

Examples for diols which can be present in the diol component along with the mixture of ethylene glycol and 1,2-propanediol are acyclic aliphatic diols, e.g., 1,3-propanediol, 1,2-butanediol, 2,3-butanediol, 1,3-butanediol, 1,4-butanediol, 2,2-dimethyl-1,3-propanediol, 1,6-hexanediol, 2-ethylhexanediol-1,3; cycloaliphatic diols, e.g., 1,2-cyclohexanediol, 1,4-cyclohexanediol, 1,2-bis-(hydroxymethyl)cyclohexane, 1,3-bis(hydroxymethyl)cyclohexane, 1,4-bis(hydroxymethyl)cyclohexane; x,8-bis(hydroxymethyl)tricyclo-[5.2.1.0$^{2,6}$]-decane, wherein x represents 3, 4 or 5; diols containing one or more oxygen atoms in the chain, e.g., diethylene glycol, triethylene glycol, dipropylene glycol or tripropylene glycol. In general, these diols contain three to 18, preferably three to 12 carbon atoms. Cycloaliphatic diols can be employed in their cis or trans configuration, or as a mixture of both forms.

II. Acid Mixture

The acid mixture used to form the polyester component of the coating composition of this invention consists essentially of a mixture of a cyclic dicarboxylic acid component and an acyclic dicarboxylic acid component.

1. Cyclic Acid Component

The acid mixture contains 91–31, preferably 75–50, molar percent of one or more aromatic or cycloaliphatic dicarboxylic acids or their functional acid derivatives.

Examples for suitable aromatic and cycloaliphatic dicarboxylic acids are phthalic acid, isophthalic acid, hexahydroterephthalic acid, tetrahydrophthalic acid, hexahydrophthalic acid, hexahydroisophthalic acid, as well as endomethylene- and endoethylene-tetrahydrophthalic acid, hexachloroendomethylenetetrahydrophthalic acid or tetrabromophthalic acid. The cycloaliphatic dicarboxylic acids can be employed in their trans or cis configuration or as a mixture of both forms. The use of dicarboxylic acids wherein the carboxyl groups are arranged in the 1,2- or in the 1,3-position is preferred. Especially preferred are those dicarboxylic acids wherein the carboxyl groups are arranged in the 1,2-position. Of these, phthalic acid and hexahydrophthalic acid are especially preferred. In general, the cyclic dicarboxylic acids contain eight to 12 carbon atoms, preferably 8 to 10 carbon atoms. The carbocyclic dicarboxylic acids are preferred, especially the monocyclic carbocyclic, e.g., wherein the ring is a benzene, cyclohexane or bridged cyclohexane ring.

2. Acyclic Acid Component

The acid mixture contains 9–67, preferably 25–50, e.g., 33–50, molar percent of one or more acyclic dicarboxylic acids containing 4-12 carbon atoms or their functional acid derivatives.

Particularly suitable aliphatic dicarboxylic acids are succinic acid, glutaric acid, adipic acid, suberic acid, sebacic acid, decanedicarboxylic acid and 2,2,4-trimethyladipic acid. Although one can use unsaturated dicarboxylic acids, such as, for example, maleic acid, fumaric acid, itaconic acid or citraconic acid, saturated aliphatic dicarboxylic acids, e.g., of four to six carbon atoms are preferred, particularly adipic acid.

In place of the cyclic and/or acyclic dicarboxylic acids themselves, it is possible and often preferable to use a functional acid derivative thereof. For example, instead of the free dicarboxylic acids, esters thereof with lower-alkanols can also be employed, e.g., the dimethyl, diethyl or dipropyl ester. The anhydrides of the dicarboxylic acids can likewise be employed, e.g., phthalic anhydride, hexahydrophthalic anhydride, tetrahydrophthalic anhydride, succinic anhydride, glutaric anhydride and maleic anhydride. Of the anhydrides, phthalic anhydride is preferred.

Coatings having particularly satisfactory properties are obtained when formed from the following linear polyesters:

1. Average molecular weight: 400–2,500, preferably 600–2,000, especially 600–1,500.

Alcohol Mixture: 70–100 molar percent, preferably 80–100 molar percent, and most preferably 100 molar percent, ethylene glycol.

In this group of linear polyesters, especially suitable are those having average molecular weights of between 600 and 2,000, produced from an acid mixture consisting of 50–75 molar percent of phthalic anhydride as the cyclic component and 50–25 molar percent of succinic anhydride as the acyclic component, and those having average molecular weights of between 600 and 1,500 produced from an acid mixture consisting of (a) 67–85 molar percent of phthalic anhydride as the cyclic component and 33–15 molar percent of adipic acid as the acyclic component or (b) 60–80 molar percent of phthalic anhydride as the cyclic component and 40–20 molar percent of a mixture of equal molar proportions of succinic anhydride and adipic acid as the acyclic component.

2. Average molecular weight: 600–4,000, preferably 800–2,500, particularly 1,000–2,000.

Alcohol mixture: 70–100 molar percent, preferably 80–100 molar percent, and most preferably 100 molar percent, 1,2-propanediol.

In this group of linear polyesters, especially suitable are those produced using only phthalic anhydride as the cyclic component and only adipic acid as the acyclic component and/or those in which 1,2-propanediol is used exclusively employed as the alcohol mixture.

3. Average molecular weight: 600–3,000, preferably 1,000–2,500.

Alcohol mixture: (i) 70–30 molar percent, preferably 60–40 molar percent, of ethylene glycol, and (ii) 30–70 molar percent, preferably 40–60 molar percent, of 1,2-propanediol.

In this group of linear polyesters, especially suitable are those produced using 75–67 molar percent of the cyclic component and 25–33 molar percent of the acyclic component, and those in which phthalic anhydride is used exclusively as the cyclic component, and/or, as the acyclic component only adipic acid or a mixture of 70–30 molar percent, preferably 60–40 molar percent, of adipic acid and 30–70 molar percent, preferably 40–60 molar percent, of succinic acid and/or the derivatives thereof, is used.

POLYESTER PRODUCTION

The polyesters can be produced according to conventional and customary processes, e.g., with or without a catalyst, with or without the introduction of an inert gas stream, as solution condensation in a solvent, as a melt condensation or azeotropic esterification, at temperatures of up to 250°C. or higher so that the water or alkanol produced by the esterification is continuously removed. The esterification takes place almost quantitatively and can be followed by measuring the hydroxyl and acid numbers. The molecular weight of the polyester can be regulated in a simple manner by charging the molar ratio of the alcohol mixture to the dicarboxylic acid mixture. Usually, the esterification conditions are selected so that the reaction is as complete as possible, i.e., in case of runs for the production of polyesters containing hydroxyl groups, those are polyester charges (batches) of $n$ mols of diol and $(n-1)$ mols of dicarboxylic acid, until the acid number is smaller than 7 mg. KOH/g. In case of runs for the production of polyesters containing carboxyl groups, those are polyester charges (batches) of $n$ mols of diol and $(n+1)$ mols of dicarboxylic acid, the esterification is continued until the hydroxyl number is below 7 mg. KOH/g.

The esterification temperature is selected so that the losses of readily volatile substances remain small, i.e., during at least the first period of the esterification, the process is conducted at a temperature below the boiling point of the lowest-boiling starting substance.

When producing the polyesters, it must be kept in mind that the molecular weight of the polyester as well as the composition thereof affect the properties of the varnish films prepared therefrom. At higher average molecular weights, the hardness of the varnish film is, in general, reduced, whereas the elasticity increases. At lower molecular weights, the flexibility of the varnish film is decreased and the hardness increased. Differences in the composition of the polyester have similar effects: With a higher proportion of aliphatic dicarboxylic acids and with a longer chain length of the aliphatic dicarboxylic acids, the elasticity of the varnish film increases, whereas its hardness is decreased. Conversely, with an increasing proportion of aromatic and/or cycloaliphatic dicarboxylic acids in the polyester, the varnish film becomes harder and less flexible. A similar influence is exerted by the other diols to be optionally concomitantly employed: With an increasing chain length of these open-chain diols which are additionally employed, and with a rising proportion of these diols in the polyester, the varnish film becomes softer and more flexible. However, when employing, in the production of the polyesters, additionally diols having short and branched carbon chains or cycloaliphatic rings, then the varnish films prepared from these polyesters normally become harder with an increasing proportion of these diols, and also less elastic. Knowing these rules, it is possible without difficulty to select, within the scope of the claimed range, polyesters exhibiting properties which are optimum for the respective purpose for which the coating compositions of this invention are employed.

AMINOPLAST-POLYESTER MIXTURE

To produce the coating compositions of this invention, the polyester and the aminoplast or precursor thereof are normally first dissolved in conventional varnish solvents, such as, for example, propanol, isopropanol, butanol, ethyl acetate, butyl acetate, ethyl glycol, ethyl glycol acetate, butyl glycol, methyl ethyl ketone, methyl isobutyl ketone, cyclohexanone, trichloroethylene, or mixtures of various ones of such solvents. It is possible and advisable for economical reasons to also employ additionally more or less large amounts of less polar solvents, e.g., benzene, toluene, xylene or higher-boiling aromatic cuts. The amounts of these less polar solvents employed can be selected as desired within the scope of the solubility of the selected polyesters therein and their compatibility with the aminoplasts which are employed, e.g., up to 80 percent and higher of the total solvent mixture.

When using polyesters having a high acid number, i.e., polyesters containing a significant number of non-esterified carboxyl groups, it is also possible to produce aqueous solutions. This can be done in accordance with conventional and customary techniques (see, for example, W. A. Reise, "Loserfreie Anstrichsysteme" [Solvent-Free Coating Systems], Curt R. Vincentz Publishers, Hannover, 1967, pp. 432 et seq.). In this connection, the carboxyl groups are normally neutralized entirely or partially with amines and, optionally, water-miscible solvents are simultaneously employed which serve as solubilizers. Of course, when producing aqueous varnish solutions, it is necessary to utilize water-soluble aminoplasts. The hereinabove-defined precursors of the aminoplasts are particularly suitable for this purpose.

The weight ratio of polyester to the aminoplast can vary between 50:50 and 90:10, preferably between 65:35 and 85:15. The ratio which is optimum for the selected end use purpose of the varnishes can be readily determined by a small number of preliminary experiments. Often, by increasing the proportion of aminoplast to polyester, the hardness of the varnish films is increased and the elasticity thereof is lessened, whereas when lowering the aminoplast to polyester proportion, the hardness decreases and the flexibility becomes larger.

The total amount of binder contained in the varnishes can be varied within customary limits, depending on the end-use application.

The varnishes can contain the conventional additives and auxiliary agents, for example pigments, flow agents, and additional other binders, such as, for example, epoxy resins and silicone resins, the latter containing hydroxyl groups.

The thus-obtained varnish is applied and baked at temperatures of between 100° and 250° C. The cross-linking reactions taking place during this process are catalytically accelerated by means of acids. When using polyesters having a very low acid number, it is thus possible to add acidic substances to the varnish. By the addition of 0.5 percent of p-toluenesulfonic acid (based on the total binder), for example, the cross-linking reaction is greatly accelerated. With the addition of larger amounts of acid, coatings can also be produced which dry at room temperature.

The acid number of the polyester can also be subsequently increased by reacting a polyester low in acid with about 1–5 percent of an anhydride of a relatively strong dicarboxylic acid, for example, maleic anhydride; thus, the baking temperatures can be lowered even without the addition of strongly acidic substances.

The coatings produced in accordance with this invention exhibit many good properties. They have a high gloss, can be very well pigmented, and show an excellent resistance against yellowing, as demonstrated by a heat aging treatment of 72 hours at 150° C. When subjecting the coatings to heat aging of 72 hours at 100° C., no visible yellowing can be detected. The coatings are resistant to solvents, e.g., xylene, petroleum ether-benzene mixtures, esters and ketones. Moreover, they exhibit good resistance to acid and alkali. In salt spray tests, tropical condition tests, and tests in the Weather-Ometer, they show an excellent corrosion-protective effect and weatherproofness.

However, the most outstanding property of the coatings of this invention is their combination of great elasticity and high hardness, which is retained even on baking.

The elastic behavior of coatings is usually determined by the Erichsen depression test (in accordance with German Industrial Standard [DIN] 53,156) using as a standard of elasticity, the depression (in mm.) of an enameled sheet metal at which the varnish coating cracks. An essential element of this testing method is that the deformation of the coating takes place slowly (advancement: 0.2 mm./sec.).

The impact depression measurement gives an indication of the reaction of the coatings to sudden deformation. This measurement can be conducted, for example, with the impact depression device 226/D of the Erichsen company, Hemer-Sundwig. In this device, a hemisphere having a radius of 10 mm. is suddenly impacted by a falling 8 kg. weight into a metal sheet on the back of the varnish-coated side. By varying the height of the falling weight, the depression can be varied. The impact depression value is the depth (in mm.) of the depression at which the varnish coating cracks. The values given in the examples were obtained in this manner. In several examples, the value is stated to be > 5 mm., since the above-described test cannot make a greater depression in the 1 mm. thick deepdrawn metal sheets employed in the test.

As has been set forth in connection with the discussion of the state of the art, and as has been proven by comparative tests, coatings of polyesters and aminoplasts have been conventional which are flexible and also withstand impact stresses. However, these coatings exhibit very low hardness values (according to DIN 53,157). On the other hand, coatings of great hardness are known which, however, exhibit a low elasticity, or none at all, or which, although elastic, have a number of other disadvantages, such as a tendency to yellow and an unsatisfactory solvent resistance. In contrast thereto, the coating obtained in accordance with the invention exhibit a high elasticity as well as great hardness and do not have any of the above-mentioned disadvantages.

This array of properties opens up a versatile range of applications to the coatings. In addition to being employed for varnishing individual parts exposed to impact stresses, one important aspect is, above all, the varnishing of materials which are postformed — for example by punching.

Therefore, the coating compositions of this invention may be used for varnishing or enameling of e.g., automobile bodies, refrigerators, washing machines, etc.; also they are suited for coil-coating. The coatings produced in accordance with this invention may be applied by different modes, e.g., spraying, dipping, brushing and wiping.

The polyesters employed in accordance with the invention result in solutions of low viscosity. Therefore, varnishes having high solids contents can be processed, which can be utilized for saving operating steps.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Unless otherwise indicated, all percentages and ratios are on a weight basis.

PREPARATION OF THE POLYESTER

A mixture of 192.2 g. of ethylene glycol (3.1 mols), 304 g. of 1,2-propanediol (4 mols), 592 g. of phthalic anhydride (4 mols), 146 g. of adipic acid (1 mol) and 100 g. of succinic anhydride (1 mol) is heated under agitation while passing a small nitrogen stream therethrough, in accordance with the following time-temperature plan: 2 hours at 140°C.; 2 hours at 160°C.; 4 hours at 190°C.; and 16 hours at 200°C. During this time, a total of 122 g. of water is separated. Thereafter, the reaction mixture is agitated for another 15 minutes at 200°C. under a vacuum of 20 torr [mm. Hg]. The clear colorless resin exhibits an acid number of 3.2 mg. KOH/g. and a hydroxyl number of 79.9 mg. KOH/g., corresponding to an average molecular weight of 1,350. The polyester is dissolved in a mixture of 8 parts by weight of xylene, 1 part by weight of butanol and 1 part by weight of ethyl glycol acetate to form a 60 percent solution.

RAISING THE ACID NUMBER OF A POLYESTER 1.2 percent of maleic anhydride (based on the pure polyester) is added to the melt of a polyester having a low acid number. After the added anhydride has been completely dissolved, the reaction mixture is heated for 1 hour to 120° C., whereby the acid number of the polyester is increased by 8.56 mg. KOH/g.

The step of raising the acid number of a polyester is normally conducted in the melt. However, no difficulties are presented in conducting the same reaction in the solution of the polyester under the above-mentioned reaction conditions. Care must be taken that the solvent does not contain any functional groups which can also react with the acid anhydride under the indicated reaction conditions.

A. PREPARATION OF A VARNISH

The solutions of the polyesters in suitable solvents, normally a mixture of xylene and a polar solvent, are mixed with a commercially available 55 percent solution of a melamine-formaldehyde condensate in a xylene-butanol mixture (1:1), or with a commercially available hexamethylol melamine derivative, in the desired solids ratio. In order to obtain a polyester : melamine resin ratio of 7:3, 117 g. of a 60% solution of the polyesters is mixed, for example, with 54.5 g. of the above-mentioned melamine resin solution.

B. PREPARATION OF AN ENAMEL

In order to prepare an enamel, a clear varnish is pigmented with $TiO_2$ in a binder : pigment ratio of 2:1.

C. PRODUCTION AND TESTING OF THE COATING COMPOSITIONS

For testing purposes, the clear varnish or the enamel is applied to metal test sheets and glass plates and baked. In order to lower the baking temperature, 0.5 percent p-toluenesulfonic acid (based on the total binder) is added to varnish solutions produced using polyesters of a low acid number. The coating thickness of the films being tested is, in all examples, 40–60 $\mu$. The hardness test is conducted according to DIN 53,157. Elasticity is determined in accordance with the methods described hereinabove.

The results of Examples 1–31 are compiled in Table 1, in which the type of the melamine resin employed is likewise set forth. (In the column headed "Type of Melamine Resin" the symbol K means that a butylated melamine-formaldehyde condensate was employed, whereas HMM indicates the use of a hexamethylol melamine derivative.)

Similar results are obtained when employing as the binder, in place of a mixture of polyester and aminoplast as described hereinabove, a so-called plasticized amino-aldehyde resin, wherein the polyesters to be employed in accordance with the invention are added to the charge during the preparation of the aminoplast resins produced from substances containing amino and/or amido groups and aldehydes. Coatings having similar properties are also obtained by employing, in place of the above-described mixture of aminoplast resins and polyesters, copolymers containing polymerized therein, additionally, acrylic acid esters, methacrylic acid esters and/or styrene, as well as optionally small amounts of acrylic acid or methacrylic acid, 5–35 percent by weight of N-methylol acrylamide, N-methylol methacrylamide and/or the derivatives thereof etherified on the N-methylol group.

Table 2 contains the test values of the coatings produced from the polyesters described in the following Comparative Examples 1–4.

COMPARATIVE EXAMPLE 1

1,580 g. of the symmetrical bis(hydroxyethyl)ether of bisphenol A (5 mols) is heated with 400 g. of succinic anhydride (4 mols) for 6 hours to 180°C., with a nitrogen stream being passed through the reaction mixture. Residual amounts of water of reaction are then removed by applying a vacuum of about 20 torr. The thus-produced polyester has an acid number of 5 mg KOH/g. The polyester is dissolved in a xylene-methyl ethyl ketone-cyclohexane mixture (1 : 1 : 1) to form a 50 percent solution.

COMPARATIVE EXAMPLE 2

(Example 2 of U.S. Pat. 2 460 186)

148 g. of phthalic anhydride, 146 g. of adipic acid, 278 g. of 2-ethylhexanediol-1,3 and 110 ml. of xylene are heated in 4 hours to 180° C. and in another 4 hours to 200° C.; the water, as formed, is separated by way of a water trap. Thereafter, solvent is slowly distilled off over a 4.5 hour period so that finally a temperature of 240° C. is attained.

COMPARATIVE EXAMPLE 3

(Example 1 from "Ullmanns Encyclopaedie der technischen Chemie," 3rd Edition, Vol. 14, p. 87, Urban & Schwarzenberg, Munich-Berlin, 1963)

1,400 g. of adipic acid (9.6 mols) and 675 g. of ethylene glycol (10.9 mols) are slowly heated to 130°-140° C., with a nitrogen stream being passed over the reaction mixture. In order to prevent glycol from being entrained when the water of reaction is distilled off, part of the distillate is introduced into the column as reflux. During the course of several hours, the reaction mixture is heated to 200° C., then cooled to 150° C., and the condensation is continued under a vacuum, until this reaction is terminated at 200 torr and 200° C., after 5-8 hours. The waxy polyester has a hydroxyl number of 54 mg. KOH/g. and an average molecular weight of 2,000; this polyester is dissolved in a xylene-methyl ethyl ketone mixture (1 : 1) to form a 50 percent solution.

COMPARATIVE EXAMPLE 4

(Example 2 from "Ullmanns Encyclopaedie der technischen Chemie," 3rd Edition, Vol. 14, p. 87, Urban & Schwarzenberg, Munich-Berlin, 1963)

316 g. of adipic acid (2.16 mols), 480 g. of phthalic anhydride (3.24 mols) and 374 g. of ethylene glycol (6.5 mols) are gradually heated to 160°-200°C., with a nitrogen stream being passed over the reaction mixture, until 118 g. of distillate has passed over. Care must be taken that the transition temperature at the head of the column does not exceed 100°C. Thereafter, another 19 g. is distilled off under an increasing vacuum over a period of 6 hours. The polyester exhibits an acid number of 3-4 mg. KOH/g. and a hydroxyl number of 56 mg. KOH/g. The polyester is dissolved in a xylene-methyl ethyl ketone-cyclohexanone mixture (1 : 1 : 1) to form a 50 percent solution.

| Example No. | Polyester from [mol] | Average molecular weight | Weight ratio polyester: melamine resin:TiO₂ | Type of melamine resin | Catalyst | Baking conditions ° C. min. | Hardness according to DIN 53,157 [sec.] | Deep drawability acc. to DIN 53,156 [mm.] | Impact depression [mm.] |
|---|---|---|---|---|---|---|---|---|---|
| 1 | 4 EG / 1.5 PA / 1.5 SA | 610 | 70:30:0 / 80:20:0 / 70:30:50 / 80:20:50 | HMM / HMM / HMM / HMM | 0.5% pTS / 0.5% pTS / 0.5% pTS / 0.5% pTS | 130°/30' / 130°/30' / 130°/30' / 130°/30' | 159 / 138 / 135 / 120 | 9.5 / >10 / 9.1 / >10 | >5 / >5 / >5 / >5 |
| 2 | 4 EG / 1.88 PA / 1.12 SA | 750 | 70:30: 0 / 70:30:50 / 70:30: 0 / 70:30: 0 | HMM / HMM / K / K | 0.5% pTS / 0.5% pTS / 0.5% pTS / 1.2% MA | 130°/30' / 130°/30' / 130°/30' / 130°/30' | 184 / 152 / 209 / 198 | 9.2 / 9.5 / 8.2 / 7.9 | >5 / 4 / 4-5 / 4 |
| 3 | 5 EG / 2 PA / 2 SA | 800 | 70:30: 0 / 70:30:50 | HMM / HMM | 0.5% pTS / 0.5% pTS | 130°/30' / 130°/30' | 139 / 121 | >10 / 9.4 | >5 / >5 |
| 4 | 7 EG / 4 PA / 2 SA | 1190 | 70:30: 0 / 80:20: 0 / 70:30:50 / 80:20:50 | HMM / HMM / HMM / HMM | 0.5% pTS / 0.5% pTS / 0.5% pTS / 0.5% pTS | 130°/30' / 130°/30' / 130°/30' / 130°/30' | 164 / 151 / 148 / 135 | 9.8 / >10 / 8.4 / 9.1 | >5 / >5 / 4 / 4-5 |
| 5 | 9 EG / 6 PA / 2 SA | 1,650 | 70:30: 0 / 80:20: 0 / 70:30:50 | HMM / HMM / HMM | 0.5% pTS / 0.5% pTS / 0.5% pTS | 130°/30' / 130°/30' / 130°/30' | 157 / 149 / 149 | 9.9 / >10 / 9.5 | 4-5 / >5 / 4 |
| 6 | 3 EG / 1 PA / 1 ADA | 480 | 70:30: 0 / 60:40: 0 / 70:30:50 | HMM / HMM / HMM | 0.5% pTS / 0.5% pTS / 0.5% pTS | 130°/30' / 130°/30' / 130°/30' | 125 / 146 / 119 | >10 / 8.4 / 8.1 | >5 / >5 / 5 |
| 7 | 4 EG / 2 PA / 1 ADA | 650 | 70:30: 0 / 70:30:50 | HMM / HMM | 0.5% pTS / 0.5% pTS | 130°/30' / 130°/30' | 161 / 135 | 9.0 / 8.5 | >5 / >5 |
| 8 | 7 EG / 5 PA / 1 ADA | 1,260 | 70:30: 0 / 80:20: 0 | HMM / HMM | 0.5% pTS / 0.5% pTS | 130°/30' / 130°/30' | 166 / 146 | >10 / 9.1 | >5 / >5 |
| 9 | 9 EG / 6 PA / 2 ADA | 1,680 | 60:40: 0 / 70:30: 0 | HMM / HMM | 0.5% pTS / 0.5% pTS | 130°/30' / 130°/30' | 142 / 115 | >10 / >10 | >5 / >5 |
| 10 | 7 EG / 4 PA / 1 SA / 1 ADA | 1,215 | 70:30: 0 / 80:20: 0 / 80:20:50 | HMM / HMM / HMM | 0.5% pTS / 0.5% pTS / 0.5% pTS | 140°/30' / 140°/30' / 140°/30' | 159 / 148 / 125 | 9.8 / >10 / >10 | >5 / >5 / >5 |
| 11 | 6 EG / 1 PG / 4 PA / 1 SA / 1 ADA | 1,235 | 70:30: 0 / 80:20: 0 / 80:20:50 | HMM / HMM / HMM | 0.5% pTS / 0.5% pTS / 0.5% pTS | 140°/30' / 140°/30' / 140°/30' | 166 / 151 / 133 | >10 / >10 / >10 | >5 / >5 / >5 |
| 12 | 5 EG / 2 PG / 4 PA / 1 SA / 1 ADA | 1,330 | 70:30:0 / 80:20:0 / 80:20:50 | HMM / HMM / HMM | 0.5% pTS / 0.5% pTS / 0.5% pTS | 140°/30' / 140°/30' / 140°/30' | 170 / 161 / 136 | 9.8 / >10 / >10 | >5 / >5 / >5 |
| 13 | 5 EG / 2 CHDM / 4 PA / 2 ADA | 1,510 | 70:30:0 / 80:20:0 / 80:20:50 | HMM / HMM / HMM | 0.5% pTS / 0.5% pTS / 0.5% pTS | 130°/30' / 130°/30' / 130°/30' | 150 / 138 / 129 | >10 / >10 / >10 | >5 / >5 / >5 |
| 14 | 4 PG / 1.5 PA / 1.5 ADA | 800 | 70:30:0 / 70:30:50 / 80:20:0 | HMM / HMM / HMM | 0.5% pTS / 0.5% pTS / 0.5% pTS | 130°/30' / 130°/30' / 130°/30' | 145 / 135 / 133 | >10 / 8.8 / >10 | >5 / >5 / >5 |
| 15 | 5 PG / 2.5 PA / 1.5 ADA | 1,030 | 70:30:0 / 80:20:0 / 80:20:50 | HMM / HMM / HMM | 0.5% pTS / 0.5% pTS / 0.5% pTS | 140°/30' / 140°/30' / 140°/30' | 161 / 143 / 135 | >10 / >10 / 9.2 | >5 / >5 / 4-5 |

| Example No. | Polyester from [mol] | Average molecular weight | Weight ratio polyester: melamine resin:TiO₂ | Type of melamine resin | Catalyst | Baking conditions °C. min. | Hardness according to DIN 53,157 [sec.] | Deep drawability acc. to DIN 53,156 [mm.] | Impact depression [mm.] |
|---|---|---|---|---|---|---|---|---|---|
| 16 | 7 PG, 4 PA, 2 ADA | 1,330 | 70:30:0<br>80:20:0<br>70:30:50<br>80:20:50 | HMM<br>HMM<br>HMM<br>HMM | 0.5% pTS<br>0.5% pTS<br>0.5% pTS<br>0.5% pTS | 130°/30'<br>130°/30'<br>130°/30'<br>130°/30' | 187<br>182<br>185<br>156 | 9.5<br>>10<br>7.6<br>>10 | 4<br>>5<br>3<br>4 |
| 17 | 9 PG, 6 PA, 2 ADA | 2,460 | 70:30:0<br>80:20:0<br>70:30:50<br>80:20:50 | HMM<br>HMM<br>HMM<br>HMM | 0.5% pTS<br>0.5% pTS<br>0.5% pTS<br>0.5% pTS | 130°/30'<br>130°/30'<br>130°/30'<br>130°/30' | 184<br>178<br>173<br>187 | 8.7<br>>10<br>9.6<br>>10 | 4-5<br>>5<br>3<br>4 |
| 18 | 9 PG, 5 PA, 3 ADA | 2,180 | 70:30:0<br>80:20:0<br>70:30:50<br>70:30:50 | HMM<br>HMM<br>HMM<br>K | 0.5% pTS<br>0.5% pTS<br>0.5% pTS<br>0.5% pTS | 140°/30'<br>140°/30'<br>140°/30'<br>130°/30' | 154<br>132<br>146<br>125 | >10<br>>10<br>9.8<br>7.8 | >5<br>>5<br>4-5<br>3-4 |
| 19 | 5 PG, 2 EG, 4 PA, 2 ADA | 1,150 | 70:30:0<br>70:30:50 | HMM<br>HMM | 0.5% pTS<br>0.5% pTS | 140°/30'<br>140°/30' | 150<br>125 | >10<br>8.7 | >5<br>4 |
| 20 | 3 PG, 1 EG, 2 PA, 1 ADA | 780 | 70:30:0<br>80:20:0<br>80:20:50 | HMM<br>HMM<br>HMM | 0.5% pTS<br>0.5% pTS<br>0.5% pTS | 140°/30'<br>140°/30'<br>140°/30' | 195<br>183<br>176 | 9.7<br>>10<br>8.3 | 2-3<br>3-4<br>2-3 |
| 21 | 12 PG, 5 EG, 10 PA, 3 SA, 3 ADA | 3,860 | 60:40:0<br>70:30:0<br>80:20:0<br>70:30:50<br>80:20:50<br>70:30:0<br>70:30:50 | HMM<br>HMM<br>HMM<br>HMM<br>HMM<br>K<br>K | 0.5% pTS<br>0.5% pTS<br>0.5% pTS<br>0.5% pTS<br>0.5% pTS<br>1.2% MA<br>0.5% pTS | 140°/30'<br>140°/30'<br>140°/30'<br>140°/30'<br>140°/30'<br>130°/30'<br>130°/30' | 163<br>150<br>132<br>128<br>110<br>161<br>134 | 9.4<br>>10<br>>10<br>>10<br>>10<br>9.8<br>8.1 | >5<br>>5<br>>5<br>>5<br>>5<br>>5<br>>5 |
| 22 | 8 PG, 1 DG, 6 PA, 2 ADA | 2,020 | 70:30:0<br>80:20:0<br>80:20:50 | HMM<br>HMM<br>HMM | 0.5% pTS<br>0.5% pTS<br>0.5% pTS | 140°/30'<br>140°/30'<br>140°/30' | 153<br>145<br>134 | >10<br>>10<br>>10 | >5<br>>5<br>>5 |
| 23 | 7 PG, 1 CHDM, 5 PA, 2 ADA | 1,890 | 70:30:0<br>70:20:0<br>70:30:50 | HMM<br>HMM<br>HMM | 0.5% pTS<br>0.5% pTS<br>0.5% pTS | 140°/30'<br>140°/30'<br>140°/30' | 173<br>161<br>156 | >10<br>>10<br>7.3 | >5<br>>5<br>4-5 |
| 24 | 2 EG, 2 PG, 2 PA, 1 ADA | 680 | 70:30:0<br>80:20:0<br>80:20:50 | HMM<br>HMM<br>HMM | 0.5% pTS<br>0.5% pTS<br>0.5% pTS | 130°/30'<br>130°/30'<br>130°/30' | 135<br>121<br>128 | 8.8<br>9.7<br>7.2 | 4<br>4-5<br>3-4 |
| 25 | 3 EG, 3 PG, 3 PA, 2 ADA | 1,270 | 70:30:0<br>80:20:0<br>70:30:50<br>80:20:50 | HMM<br>HMM<br>HMM<br>HMM | 0.5% pTS<br>0.5% pTS<br>0.5% pTS<br>0.5% pTS | 140°/30'<br>140°/30'<br>140°/30'<br>140°/30' | 161<br>149<br>152<br>138 | >10<br>>10<br>>10<br>>10 | >5<br>>5<br>4-5<br>5 |
| 26 | 4 EG, 4 PG, 5 PA, 2 ADA | 1,430 | 70:30:0<br>80:20:0<br>70:30:0<br>80:20:0<br>75:25:50 | HMM<br>HMM<br>K<br>K<br>HMM | 0.5% pTS<br>0.5% pTS<br>0.5% pTS<br>1.2% MA+<br>0.5% pTS | 140°/30'<br>140°/30'<br>130°/30'<br>130°/30'<br>140°/30' | 178<br>164<br>181<br>173<br>148 | >10<br>>10<br>9.5<br>>10<br>>10 | >5<br>>5<br>4-5<br>>5<br>4-5 |
| 27 | 3 EG, 7 PG, 6 PA, 1.5 ADA, 1.5 SA | 2,330 | 70:30:0<br>80:20:0<br>80:20:50 | HMM<br>HMM<br>HMM | 0.5% pTS<br>0.5% pTS<br>0.5% pTS | 140°/30'<br>140°/30'<br>140°/30' | 181<br>175<br>159 | >10<br>>10<br>>10 | >5<br>>5<br>4-5 |
| 28 | 4 EG, 9 PG, 8 PA, 2 ADA, 2 SA | 2,810 | 70:30:0<br>80:20:0<br>80:20:50 | HMM<br>HMM<br>HMM | 0.5% pTS<br>0.5% pTS<br>0.5% pTS | 140°/30'<br>140°/30'<br>140°/30' | 178<br>160<br>145 | >10<br>>10<br>>10 | >5<br>>5<br>>5 |
| 29 | 4 EG, 3 PG, 4 PA, 1 ADA, 1 SA | 1,500 | 70:30:0<br>80:20:0<br>80:20:0<br>80:20:50 | HMM<br>HMM<br>K<br>HMM | 0.5% pTS<br>0.5% pTS<br>0.5% pTS<br>0.5% pTS | 140°/30'<br>140°/30'<br>130°/30'<br>140°/30' | 181<br>176<br>179<br>153 | >10<br>>10<br>8.8<br>>10 | >5<br>>5<br>4<br>>5 |
| 30 | 3 EG, 4 PG, 4 PA, 1 ADA, 1 SA | 1,350 | 70:30:0<br>80:20:0<br>80:20:50 | HMM<br>HMM<br>HMM | 0.5% pTS<br>0.5% pTS<br>0.5% pTS | 140°/30'<br>140°/30'<br>140°/30' | 192<br>184<br>176 | >10<br>>10<br>>10 | >5<br>>5<br>4 |
| 31 | 4 EG, 4 PG, 1 DG, 6 PA, 1 ADA, 1 SA | 1,670 | 70:30:0<br>80:20:0<br>80:20:50 | HMM<br>HMM<br>HMM | 0.5% pTS<br>0.5% pTS<br>0.5% pTS | 140°/30'<br>140°/30'<br>140°/30' | 173<br>165<br>148 | >10<br>>10<br>9.9 | 4-5<br>>5<br>3-4 |

+) Abbreviations:
EG ethylene glycol
PG 1,2-propanediol
PA phthalic anhydride
ADA adipic acid
HMM hexamethylol melamine derivative
K melamine-formaldehyde condensate
pTS p-toluenesulfonic acid
MA maleic anhydride (The polyester which is low in acid is brought to a higher acid number by reaction with the indicated amount of maleic anhydride — based on the pure polyester — in accordance with the method described hereinbefore.)
DG diethylene glycol
SA succinic anhydride
CHDM 1,4-bis-(hydroxymethyl)-cyclohexane From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalents of the following claims.

What is claimed is:

1. A coating composition containing an aminoplast-polyester mixture comprising:

TABLE 2

| Comparative example No. | Polyester from [mol] | Average molecular weight | Weight ratio polyester: melamine resin:TiO₂ | Type of melamine resin | Catalyst | Baking conditions | Hardness acc. to DIN 53,157 [sec.] | Deep drawability acc. to DIN 53,156 [mm.] | Impact depression [mm.] |
|---|---|---|---|---|---|---|---|---|---|
| 1 | 5 HABA¹ / 4 BSA¹ | 1,880 | 70:30:0 / 70:30:0 | K¹ / HMM¹ | 0.5% pTS / 0.5% pTS | 130°:30' / 130°:30' | 135 / 126 | 1.1 / 1.9 | <1 / <1 |
| 2 | 1.91 AHD¹ / 1 PSA¹ / 1 ADS¹ | 1,750 | 70:30:0 / 70:30:0 | K / HMM | 0.5% pTS / 0.5% pTS | 130°:30' / 130°:30' | 35 / 19 | 2.0 / >10 | <1 / >5 |
| 3 | 10.9 AG¹ / 9.6 ADS | 2,000 | 70:30:50 / 70:30:0 | K / HMM | 0.5% pTS / 0.5% pTS | 130°:30' / 130°:30' | 45 / 39 | 6.1 / 8.8 | >5 / >5 |
| 4 | 6.5 AG / 3.24 PSA / 2.16 ADS | 2,050 | 70:30:50 / 70:30:0 | K / HMM | 0.5% pTS / 0.5% pTS | 130°:30' / 130°:30' | 25 / 22 | 7.9 / 9.1 | >5 / >5 |

¹ Abbreviations:
HABA=bis(hydroxyethyl)-ether of bisphenol A,
BSA=succinic anhydride,
K=melamine-formaldehyde condensate,
HMM=hexamethylol melamine derivative,
AHD=2-ethylhexanediol-1,3,
PSA=phthalic anhydride,
ADS=adipic acid,
AG=ethylene glycol,
pTS=p-toluensesulfonic acid.

A. 50–10 percent by weight of the aminoplast component and
B. 50–90 percent by weight of a mixture of linear polyesters having an average molecular weight between 600 and 4,000 produced by the esterification of
 I. an alcohol mixture consisting essentially of:
  1. both ethylene glycol and 1,2-propanediol, and
  2. 0–30 molar percent of the total alcohol mixture of another diol selected from the group consisting of aliphatic and cycloaliphatic diols or mixtures thereof whose hydroxyl groups are separated by two to eight carbon atoms and contain from zero to two oxygen atoms in the chain which are separated from each other by at least two carbon atoms, and
 II. an acid mixture consisting essentially of:
  1. 91–33 molar percent of a cyclic acid component of at least one aromatic or cycloaliphatic dicarboxylic acid or functional acid derivative thereof convertible to said ester with said alcohol mixture wherein the carboxyl groups are positioned 1,2- or 1,3- with respect to each other, and
  2. 9–27 molar percent of an acyclic acid component of at least one aliphatic dicarboxylic acid of four to 12 carbon atoms or a functional acid derivative thereof convertible to said ester with said alcohol mixture.

2. A coating composition according to claim 1 wherein the acyclic acid component of the acid mixture contains four to six carbon atoms and the alcohol component consists essentially of 70–30 molar percent of ethylene glycol and 30–70 molar percent of 1,2-propanediol.

3. A coating composition according to claim 1 wherein the polyesters have an average molecular weight between 600 and 3,000 and are produced from alcohol mixture consisting of:
 1. 70–30 molar percent of ethylene glycol and 30–70 molar percent of 1,2-propanediol, and
 2. 30 molar percent of the total alcohol mixture of another diol selected from the group consisting of aliphatic and cycloaliphatic diols or mixtures thereof whose hydroxyl groups are separated by two to eight carbon atoms and contain from zero to two oxygen atoms in the chain which are separated from each other by at least two carbon atoms.

4. A coating composition according to claim 3 wherein the polyesters have an average molecular weight between 1,000 and 2,500.

5. A coating composition according to claim 3 wherein the polyesters are produced from an acid mixture consisting of 75–67 molar percent of the cyclic component and 25–33 molar percent of the acyclic component.

6. A coating composition according to claim 3 wherein the polyesters are produced from an acid mixture consisting of adipic acid as the acyclic component.

7. A coating composition according to claim 3 wherein the polyesters are produced from an acid mixture in which the acyclic component consists of 70–30 molar percent of adipic acid and 30–70 molar percent of succinic acid.

8. A coating composition according to claim 3 wherein the polyesters are produced from an acid mixture in which phthalic anhydride is the cyclic component.

* * * * *